(12) United States Patent
Qumei et al.

(10) Patent No.: US 8,103,264 B2
(45) Date of Patent: Jan. 24, 2012

(54) OPEN UPDATE FRAMEWORK FOR MOBILE HANDSETS CAPABLE OF PROCESSING PACKAGES BASED ON MIME-TYPES

(75) Inventors: Iyad Qumei, Huntington Beach, CA (US); Teck Chia, Aliso Viejo, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 11/852,933

(22) Filed: Sep. 10, 2007

(65) Prior Publication Data

US 2008/0125105 A1    May 29, 2008

Related U.S. Application Data

(63) Continuation of application No. 10/698,665, filed on Oct. 30, 2003, now abandoned.

(51) Int. Cl.
*H04M 3/00* (2006.01)
(52) U.S. Cl. .................. 455/418; 455/419; 455/420
(58) Field of Classification Search ........... 455/418–429
See application file for complete search history.

(56) References Cited

U.S. PATENT DOCUMENTS

2004/0237083 A1* 11/2004 Alcazar et al. ............... 717/178
2005/0096025 A1   5/2005 Qumei et al.

OTHER PUBLICATIONS

C. Enrique Ortiz, "Introduction to OTA Application Provisioning", Nov. 2002, http://developers.sun.com/techtopics/mobility/midp/articles/ota/ retrieved on Jun. 10, 2010.*
Oommen, P., "A framework for integrated management of mobile-stations over-the-air", Integrated Network Management Proceedings, 20014 IEEE/IFIP Internanations Symposium on May 14-18, 2001 pp. 247-256.*
C. Enrique Ortiz, "Introduction to OTA Application Provisioning", Nov. 2002, http://developers.sun.com/techtopics/mobility/midp/articles/otal/ retrieved on Mar. 29, 2007.
Oommen, R, "A framework for integrated management of mobile-stations over-the-air", Integrated Network Management PRoceedings, 2001 IEEE/IFIP International Symposium on May 14-18, 2001 pp. 247-256.
Oommen, R, "Over the air handset management", Emerging Technologies Symposium: Broadband, Wireless Internet Access, 2000 IEEE Apr. 10-11, 2000 pp. 4 pp.
"Over the Air User Initiated Provisioning Recommended Practice for the Mobile Information Device Profile", Version 1.0, May 7, 2001.

* cited by examiner

*Primary Examiner* — Kamran Afshar
*Assistant Examiner* — Sayed T Zewari

(57) ABSTRACT

Disclosed herein is a mobile handset, part of an open update framework, that uses a mime-type to determine if an update package received is appropriate for an update activity, or is currently supported. In addition, it uses the mime-type to determine where the downloaded update package needs to be stored in non-volatile memory, such as Flash. It also uses the mime-type to invoke an appropriate firmware, software or configuration update agent.

19 Claims, 1 Drawing Sheet

Figure 1

US 8,103,264 B2

Figure 1:
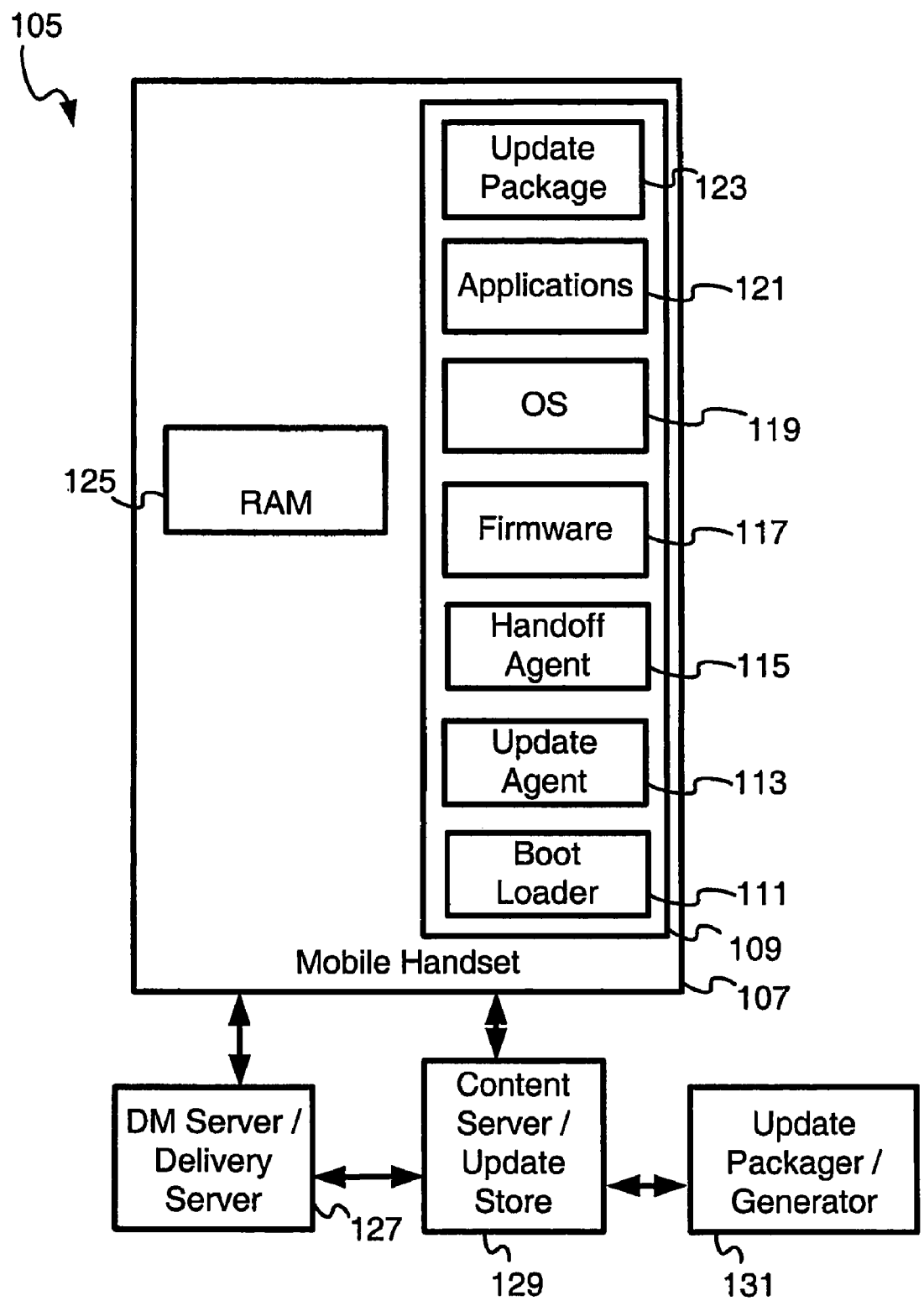

OPEN UPDATE FRAMEWORK FOR MOBILE HANDSETS CAPABLE OF PROCESSING PACKAGES BASED ON MIME-TYPES

CROSS-REFERENCE TO OTHER APPLICATIONS

The present application is a continuation application of U.S. patent application Ser. No. 10/698,665, filed Oct. 30, 2003 now abandoned, which is hereby incorporated herein by reference, in its entirety. The present application also hereby incorporates herein by reference the complete subject matter of U.S. Provisional patent application Ser. No. 60/249,606 filed on Nov. 17, 2000, in its entirety.

The present application also hereby incorporates herein by reference the complete subject matter of PCT application having publication number WO/02/41147 A1, and having application number PCT/US01/44034, filed on Nov. 19, 2001, in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs, introduce new features, or both.

A generator in a manufacturing environment of an electronic device such as a mobile handset, or in other software development environments, generates update packages that are used to update the firmware of software components. These update packages are deposited into repository. Unfortunately, several different generators will be generating different kinds of information. There is no easy way to process these different kinds of update packages in mobile handsets without first determining what these update packages contain, or which application or component in the mobile handset is capable of handling them. There is no easy way to distinguish between these update packages that are generated by different vendors or manufacturers. Mobile handsets that receive them cannot easily distinguish them from each other in order to process them appropriately.

A telecom carrier or a wireless carrier will have to support storing update packages received from several different sources, each source potentially employing various different formats for data to be transferred to the carrier network/wireless network. Thus, there is currently no easy way to distinguish update packages delivered to the server environments from other types of information.

Other problems and deficiencies of the prior art will become apparent to one skilled in the art after referencing such art in view of the reminder of this specification and drawings.

SUMMARY OF THE INVENTION

Aspects of the present invention may be found in a method for updating a mobile handset. The method may comprise using a mime-type associated with the update package to determine if the update package received is appropriate for updating the mobile handset. The method may also comprise invoking an appropriate update agent, based on the mime-type, for updating the mobile handset.

In an embodiment of the present invention, invoking an appropriate update agent comprises determining which of a plurality of update agents are capable of processing the update package and invoking one of the plurality of update agents that is determined to be capable of processing the update package.

In a further embodiment of the present invention, the mobile handset comprises firmware, software or configuration and the invoking one of the plurality of update agents comprises invoking an appropriate one of the plurality of update agents to perform an update of the firmware, software or configuration of the mobile handset.

In a related embodiment a different mime-type is associated with update packages that are used to update firmware, update packages that are used to update software and update packages that are used to update configuration in the mobile handset.

In another embodiment of the present invention, the method further comprises registering the update agent and associated mime-types such that the mobile handset is able to determine the mime-types supported or processed by the update agent.

In an embodiment of the method, the method further comprises using the mime-type associated with the update package to determine where the update package needs to be stored in non-volatile memory.

In a related embodiment, the method further comprises using the mime-type associated with the update package to determine where the status is stored in the mobile handset following the invoking of an appropriate update agent.

Aspects of the present invention may also be found in an open update framework with producers and consumers of update packages wherein the open update framework comprises delivery means for the delivery of update packages and consumption means for consuming update packages. The open update framework provides the consumers of update packages access to a large variety of update packages in an interoperable manner.

In an embodiment of the open update framework, the producers of update packages designate a mime-type with the update packages and the consumers of update packages employ the mime-type to determine how to consume the update packages.

In another embodiment of the open update framework, the producers of update packages are update package generators capable of generating update packages based on an old version of firmware or software and a new version of the firmware and software and associating a mime-type with the update packages.

In another embodiment of the open update framework, the consumers of update packages are update agents in mobile handsets.

In another embodiment of the open update framework, the consumers of update packages are download agents or browsers in mobile handsets.

In another embodiment of the open update framework, the consumers of update packages are handoff agents in mobile handsets.

In another embodiment of the open update framework, a generator creates one or more update packages, determines the metadata, associates an appropriate mime-type with each of the update packages generated, populates the metadata with the mime-type, determines or computes security information such as signatures, and incorporates them into an update package container.

In another embodiment of the open update framework, a content server serves as a repository of update packages for distribution to the mobile handsets and a mime-type is associated with the update package container created by the generator. In addition, the content server process the update package container based upon the mime-type associated update package container.

Aspects of the present invention may be found in a mobile handset with non-volatile memory that is capable of processing an update package, the mobile handset comprising a download agent or a browser that uses a mime-type associated with the update package to determine if the update package received is appropriate for an update activity or is currently supported. The mobile handset also comprises a handoff agent that determines where the update package with an associated mime-type must be stored in non-volatile memory when it is downloaded and an update agent that uses the mime-type related information to determine if the update package is appropriate for the firmware, software or configuration of the mobile handset.

In one embodiment of the mobile handset, the update agent is selected from a plurality of available agents based on the mime-type of the update package.

In one embodiment of the mobile handset, the handoff agent is selected from a plurality of available agents based on the mime-type of the update package.

In one embodiment of the mobile handset, the download agent is selected from a plurality of available agents based on the mime-type of the update package.

In one embodiment of the mobile handset, the mime-type of the update package has an associated magic number that is included in the update package.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

FIG. 1 is a perspective diagram of an open update framework for mobile handsets that is used in a network, such as a carrier network, that can download update packages employing over-the-air (OTA) or other techniques and update its firmware and software, etc., each of the update packages being associated with a corresponding mime-type; and APPENDIX A—New Access Types for Firmware, Software and Configuration Update Packages.

DETAILED DESCRIPTION OF THE DIAGRAMS

FIG. 1 is a perspective diagram of an open update framework 105 for mobile handsets 107 that is used in a network, such as a carrier network, that can download update packages employing over-the-air (OTA) or other techniques and update its firmware 117 and software 119, 121, etc., each of the update packages being associated with a corresponding mime-type. In the open update framework, the mobile handset 107 employs the mime-type to determine an appropriate agent, such as the update agent 113, that is capable of processing the update packages 123.

Typically, an update package is generated by an update packager/generator 131 and is transferred, employing an update package container (UPC) format, to a content server/update store 129 that is communicatively coupled to the mobile handset 107, either directly or via a device management (DM) server/delivery server 127. The UPC has an associated mime-type and, in one embodiment, the content server/update store 129 processes the UPC based upon its mime-type.

In general, the mobile handset 107 uses a mime-type to determine if an update package received is appropriate for an update activity or is currently supported. In addition, it uses a mime-type to determine where the downloaded object needs to be stored in non-volatile memory, such as Flash. It also uses the mime-type to invoke an appropriate firmware, software or configuration update agent.

In one embodiment, the mobile handset employs a mime-type of an update package and associated parameters (processor, binary layout, etc.) to determine what type of agent needs to be to invoked, where to save update package, etc.

In one embodiment, a plurality of download agents and handoff agents are available in the mobile handset 107 and the mobile handset employs the appropriate one of the plurality of download agents and hand-off agents based upon the mime-type associated with the update package.

In one embodiment, a plurality of handoff agents 115 are available in the mobile handset 107 and the mobile handset employs the appropriate one of the plurality of handoff agents 115 for storing the download update package at appropriate locations in non-volatile or volatile memory of the mobile handset, for selectively processing or storing the metadata associated with the update package, and to set flags and other parameters, based upon the mime-type associated with the downloaded update package.

In one embodiment, a plurality of update agents are available in the mobile handset 107 and the mobile handset employs an appropriate one of the plurality of update agents for processing the download update package based upon the mime-type associated with the downloaded update package.

In one embodiment, the update package 123 is saved in a pre-determined location by the handoff agent 115 after it has been downloaded by a download agent or a browser, the pre-determined location being based on the mime-type associated with the update package 123.

In one embodiment, a browser application 121 in the mobile handset 107 has several update agent plug-ins 113 registered with it, each update agent plug-in 113 associated with a different mime-type. The browser invokes the right update agent plug-in 113 based on the mime-type associated with the update package downloaded from a server or URL.

The update packager/generator 131 creates one or more update packages, determines the metadata, associates a mime-type with the update package generated, populates the metadata with the mime-type, determines or computes security information such as signatures and incorporates them into an update package container/catalog (UPC) that is then communicated to the content server/update store 129 that serves as a repository for the network 105. The UPC itself has an appropriate mime-type associated with it. The content server/update store 129 is capable of parsing the update package container of that mime-type, and is capable of selectively retrieving all or a subset of the available update packages, selectively verifying the authenticity of the update package catalog as well as that of the update packages themselves, and saving information in a storage, and, in general, behaving as a repository of update packages and associated metadata.

Update packages from one or more manufacturers with generators 131 is sent to the content server/update store 129 for storage and subsequent dissemination to mobile handsets 107 via the DM Server/Delivery server 127. The mime-type of the UPC are used by the content server/update store 129 to process the UPC appropriately employing the corresponding parsers, security mechanisms and other utilities.

In general, the network 105 comprises a generator that is communicatively coupled to an update store (or some repository) and employs an UPC that can be used to save information, using an XML format, the UPC having an associated mime-type. The UPC comprising one or more update packages for one or more devices and one or more transitions of versions for each device, is created by the generator and transferred to the update store/repository, where it is processed based on its mime-type by the appropriate processing components. The UPC also comprises metadata information, security information, etc.

The present invention is also aimed at defining an open update framework for the delivery and consumption (for example, by the client-side agents) in the delivery and consumption chain, a chain that might include server-side consumers as well as client-side consumers. This open framework will provide content creators, producers, distributors and service providers with equal opportunities in the firmware and software update market. This will also be to the benefit of the content consumer providing them access to a large variety of content in an interoperable manner.

The present invention is based on two essential concepts: the definition of a fundamental unit of distribution and transaction (the update package) and the concept of agents interacting with the update packages. The update packages can be considered the "what" of the update framework (e.g., a firmware update, software update, configuration update) and the user devices, specifically the agents (download agents, handoff agents, update agents, etc.) can be considered the "who" of the update framework.

The goal of the present invention can thus extended to include defining the technology needed to support mobile handsets to exchange, access, consume, trade and otherwise manipulate update packages in an efficient, transparent and interoperable way.

Thus, the present invention provides for the standardization of the process of manipulating update packages for firmware, software, configuration, etc. by appropriate client-side agents in the mobile handsets.

The suggested update framework and associated mime-types identifies and defines the mechanisms and elements needed to support the update package delivery chain as described above as well as the relationships between and the operations supported by them. Within the parts of the suggested mime-types, these elements are elaborated by defining the syntax and semantics of their characteristics, such as interfaces to the functional elements.

One aspect of the update framework is the definition of associated security and access control mechanisms. The update framework provides for the specification of various types of access rights, such rights can be used to express the agreements between the update package provider and the end user.

Although a system and method according to the present invention has been described in connection with a preferred embodiment, the invention is not intended to be limited to the specific form set forth herein, but on the contrary, is intended to cover such alternative modifications and equivalents, as can be reasonably included within the spirit and scope of the invention, as defined by this disclosure and the appended diagrams. It is intended that the scope of the invention be limited not with this detailed description, but rather by the claims appended hereto.

1 Appendix A—New Access Types for Firmware, Software and Configuration Update Packages 1.1 Introduction Bitfone would like to seek the registration of new access types (MIME media types) to facilitate the download and subsequent update of firmware, software, configuration parameters, etc. in mobile handsets.

The content to be downloaded may be:
a) Firmware update packages
b) Software update packages
c) Configuration update packages where the term "update packages" refers to a compressed format (perhaps proprietary) employed for the packaging of "difference information" and associated metadata, the generation of which is targeted towards the update of specific devices. Such update packages may be generated by "Generators" that implement various proprietary or non-proprietary "differencing algorithms", etc. and output them into a format that is understood by corresponding agents (client components) in a mobile handset.

The dissemination of update packages is typically performed by web-sites, portals, device management servers in a carrier network, etc. Mobile handsets or other client devices request and/or receive the update packages and process them to update the firmware, software and/or configuration parameters.

Typically, more than one agents may reside in a mobile handset (or other similar client devices) that can act upon the appropriate mime-type to:
a) field the incoming data of that mime-type
b) process/render the incoming data of that mime-type 1.2 Proposed Mime-Types The proposed mime types are of two kinds, vendor specific (proprietary) and generic.

1.2.1 Encoding Considerations

Update packages, in general, are binary embedded in XML. Some portions of update packages may be quite readable but many include within them some digital signature information and many have large portions encrypted or compressed. This signature and/or encrypted information is essentially binary and may be base 64 encoded in certain fields. In the future, Content-Transfer-Encoding may be required.

1.2.2 General Security Considerations

The update packages are interpreted by client-side agents, such as Bitfone's mProve update agent. The update packages themselves contain certain security-related information that may be employed for authentication and integrity checks. However, in general, update packages from unknown sources should never be considered as trustable.

In general, the update packages do not include macros or code directly executable on the user's system.

The proposed system is designed so that a secure channel is not required other than for privacy reasons. Someone observing the proposed messages may be able to tell who is transferring the update packages to whom and for what reason but they will not be able to misuse the update packages or decipher what it contains based on these messages unless they can break the compression and cryptosystems employed. Use of the proposed update packages within a secure envelope will usually eliminate all privacy concerns other than basic traffic analysis. No currently defined update packages has any "executable" material.

1.2.3 Published Specification

The specifications for this content-type may be proprietary, especially the ones that are vendor-specific. For example, mProve specification are specified by Bitfone, Corp. The registration of these content-type is intended only to provide a convention for labeling such proprietary/non-proprietary data type within the MIME/HTTP environment and does not specify any details about the content format or semantics, except to refer to the software and specifications provided by Bitfone, Corp.

1.3 New Generic Mime-Types

The following three generic mime types are recommended:
'application/firmware-update'
'application/software-update'
'application/configuration-update'

Although these mime-types have not been provided with parameters, it is conceivable that vendor names or some vendor-specific information may be provided as a parameter.

1.3.1 Application/firmware-update
MIME type name: application
MIME subtype name: firmware-update
Required parameters: none
Optional parameters: none
Encoding considerations: See section 1.2.1 above
Security considerations: See section 1.2.2 above
Published specification: See section 1.2.3 above
Person & email address to contact for further information:
Bindu Rama Rao
Senior Engineer
Bitfone Corp.
(949) 234-7000
email: brao@bitfone.com 1.3.2 Application/software-update
MIME type name: application
MIME subtype name: software-update
Required parameters: none
Optional parameters: none
Encoding considerations: See section 1.2.1 above.
Security considerations: See section 1.2.2 above.
Published specification: See section 1.2.3 above.
Person & email address to contact for further information:
Bindu Rama Rao
Senior Engineer
Bitfone Corp.
(949) 234-7000
email: brao@bitfone.com 1.3.3 Application/configuration-update
MIME type name: application
MIME subtype name: configuration-update
Required parameters: none
Optional parameters: none
Encoding considerations: See section 1.2.1 above.
Security considerations: See section 1.2.2 above.
Published specification: See section 1.2.3 above.
Person & email address to contact for further information:
Bindu Rama Rao
Senior Engineer
Bitfone Corp.
(949) 234-7000
email: brao@bitfone.com 1.4 New Vendor Specific Mime-types The following three vendor-specific mime types are recommended:
'application/vnd.bitfone.firmware-update'
'application/vnd.bitfone.software-update'
'application/vnd.bitfone.configuration-update'

1.4.1 Application/vnd.bitfone.firmware-update
MIME type name: application
MIME subtype name: vnd.mprove-firmware-update
Required parameters: none
Optional parameters: none
Encoding considerations: See section 1.2.1 above.
Security considerations: See section 1.2.2 above.
Published specification: See section 1.2.3 above.
Person & email address to contact for further information:
Bindu Rama Rao
Senior Engineer
Bitfone Corp.
(949) 234-7000
email: brao@bitfone.com 1.4.2 Application/vnd.bitfone.software-update
MIME type name: application
MIME subtype name: vnd.mprove-software-update
Required parameters: none
Optional parameters: none
Encoding considerations: See section 1.2.1 above.
Security considerations: See section 1.2.2 above.
Published specification: See section 1.2.3 above.
Person & email address to contact for further information:
Bindu Rama Rao
Senior Engineer
Bitfone Corp.
(949) 234-7000
email: brao@bitfone.com 1.4.3 Application/vnd.bitfone.configuration-ipdate
MIME type name: application
MIME subtype name: vnd.mprove-configuration-update
Required parameters: none
Optional parameters: none
Encoding considerations: See section 1.2.1 above.
Security considerations: See section 1.2.2 above.
Published specification: See section 1.2.3 above.
Person & email address to contact for further information:
Bindu Rama Rao
Senior Engineer
Bitfone Corp.
(949) 234-7000
email: brao@bitfone.com 1.5 Mime-type for a Container of Update Packages A container of update packages, called Update Package Container (UPC), that contains one or more update packages, requires a mime-type to enable its automated processing by servers. The following generic mime-type is proposed:
Application/Updatepackagecontainer
MIME type name: application
MIME subtype name: updatepackagecontainer
Required parameters: none
Optional parameters: none
Encoding considerations: See section 1.2.1 above.
Security considerations: See section 1.2.2 above.
Published specification: See section 1.2.3 above.
Person & email address to contact for further information:
Bindu Rama Rao
Senior Engineer
Bitfone Corp.
(949) 234-7000
email: brao@bitfone.com

What is claimed is:
1. A method for updating a mobile handset using an update package, the method comprising:

using a mime-type associated with the update package to determine whether the update package received is appropriate for updating the mobile handset;

invoking at least one of a plurality of update agents in the mobile handset, based on the associated mime-type, if the associated mime-type is appropriate for updating the mobile handset; and refraining from updating the mobile handset and continuing with regular operation of the mobile handset, if the mime-type associated with the update package is not appropriate for updating the mobile handset, wherein invoking at least one update agent comprises determining which of the plurality of update agents are capable of processing the update package and invoking one of the plurality of update agents that is determined to be capable of processing the update package.

2. The method of claim 1 wherein invoking at least one update agent comprises determining which of the plurality of update agents are capable of processing the update package and invoking one of the plurality of update agents that is determined to be capable of processing the update package.

3. The method of claim 1 wherein the mobile handset comprises firmware, software or configuration and wherein the invoking one of the plurality of update agents comprises invoking an appropriate one of the plurality of update agents to perform an update of the firmware, software or configuration of the mobile handset.

4. The method of claim 3 wherein a different mime-type is associated with update packages that are used to update firmware, update packages that are used to update software and update packages that are used to update configuration in the mobile handset.

5. The method of claim 4 further comprising: registering the update agent and associated mime-types such that the mobile handset is able to determine the mime-types supported or processed by the update agent.

6. The method of claim 1 wherein the method further comprises using the mime-type associated with the update package to determine where the update package needs to be stored in non-volatile memory.

7. The method of claim 1 wherein the method further comprises using the mime-type associated with the update package to determine where status information is stored in the mobile handset following the invoking of the one of the plurality of update agents.

8. An open update framework with producers and consumers of update packages for updating memory in an electronic device, the open update framework comprising:

delivery means for the delivery of update packages, each update package having an associated mime type;

consumption means for consuming update packages stored in non-volatile memory of the electronic device;

wherein the open update framework provides the consumers of update packages access to a large variety of update packages in an interoperable manner by supporting addition and registration at the electronic device of one or more executable code portions, each executable code portion enabling consumption by the electronic device of update information associated with a mime-type that is new to the electronic device;

the producers of update packages designating a mime-type with the update packages; and the consumers of update packages employing the mime-type to determine how to consume the update packages.

9. The open update framework of claim 8 wherein the producers of update packages are capable of generating each update package based on an old version of firmware or software and a new version of the firmware or software and associating a mime-type with the update package.

10. The open update framework of claim 8 further comprising: the consumers of update packages wherein the consumers of update packages are update agents in mobile handsets.

11. The open update framework of claim 8 further comprising:

the consumers of update packages wherein the consumers of update packages are download agents or browsers in mobile handsets.

12. The open update framework of claim 8 further comprising: the consumers of update packages wherein the consumers of update packages are handoff agents in mobile handsets.

13. The open update framework of claim 8 further comprising a generator that creates one or more update packages, determines the metadata, associates an appropriate mime-type with each of the update packages generated, populates the metadata with the mime-type, determines or computes security information comprising signatures, and incorporates them into an update package container.

14. The open update framework of claim 10 further comprising a content server that serves as a repository of update packages for distribution to the mobile handsets;

a mime-type associated with an update package container created by the generator; and wherein the content server processes the update package container based upon the mime-type associated update package container.

15. A mobile handset comprising:

a least one processor communicatively coupled to non-volatile memory having resident therein code executable by the at least one Processor for processing an update package, the code comprising:

a download agent or a browser that uses a mime-type associated with the update package to determine whether the update package received is appropriate for an update activity or is currently supported;

a handoff agent that determines where the update package with associated mime-type is to be stored in non-volatile memory when it is downloaded; and at least one update agent that uses the associated mime-type to determine whether the update package is appropriate for updating firmware, software or configuration of the mobile handset.

16. The mobile handset of claim 15 wherein the at least one update agent is selected from a plurality of available agents based on the mime-type of the update package.

17. The mobile handset of claim 15 wherein the handoff agent is selected from a plurality of available handoff agents based on the mime-type of the update package.

18. The mobile handset of claim 15 wherein the download agent is selected from a plurality of available download agents based on the mime-type of the update package.

19. The mobile handset of claim 15 wherein the mime-type of the update package has an associated magic number that is included in the update package.

* * * * *

UNITED STATES PATENT AND TRADEMARK OFFICE
CERTIFICATE OF CORRECTION

PATENT NO.        : 8,103,264 B2
APPLICATION NO.   : 11/852933
DATED             : January 24, 2012
INVENTOR(S)       : Iyad Qumei et al.

It is certified that error appears in the above-identified patent and that said Letters Patent is hereby corrected as shown below:

On the Title page, in Item (54), and Column 1, line 2, Title, after "PROCESSING" insert
-- FIRMWARE AND SOFTWARE UPDATE --.

In column 10, line 36, in Claim 15, delete "a least" and insert -- at least --, therefor.

Signed and Sealed this
Sixteenth Day of October, 2012

David J. Kappos
*Director of the United States Patent and Trademark Office*